United States Patent
Bowles

(10) Patent No.: US 9,346,342 B1
(45) Date of Patent: May 24, 2016

(54) VEHICLE ROOF AND ROOF OPENING MECHANISM

(71) Applicant: Webasto-Edscha Cabrio GmbH, Stockdorf (DE)

(72) Inventor: Jason Bowles, Owosso, MI (US)

(73) Assignee: WEBASTO-EDSCHA CABRIO GMBH, Stockdorf (DE)

( * ) Notice: Subject to any disclaimer, the term of this patent is extended or adjusted under 35 U.S.C. 154(b) by 0 days.

(21) Appl. No.: 14/642,976

(22) Filed: Mar. 10, 2015

(51) Int. Cl.
*B60J 7/11* (2006.01)
*B60J 7/12* (2006.01)
*B60J 7/06* (2006.01)

(52) U.S. Cl.
CPC ...... *B60J 7/06* (2013.01); *B60J 7/12* (2013.01)

(58) Field of Classification Search
CPC ............ B60J 7/061; B60J 7/064; B60J 7/065; B60J 7/10; B60J 7/11; B60J 7/12; B60J 7/106
USPC ................................................. 296/218, 219
See application file for complete search history.

(56) References Cited

U.S. PATENT DOCUMENTS

| | | | | | |
|---|---|---|---|---|---|
| 5,018,783 | A | * | 5/1991 | Chamings | B60J 7/22 296/217 |
| 5,267,774 | A | * | 12/1993 | Garner | B60J 7/1226 296/218 |
| 7,523,977 | B2 | | 4/2009 | Fallis, III | |
| 7,527,328 | B2 | * | 5/2009 | Reitzloff | B60J 7/022 296/219 |
| 8,186,740 | B2 | * | 5/2012 | Huotari | B60J 7/12 296/100.09 |
| 9,139,073 | B2 | * | 9/2015 | Haberkamp | B60J 7/1291 |
| 2005/0134096 | A1 | | 6/2005 | Fallis, III | |
| 2014/0300143 | A1 | | 10/2014 | Haberkamp et al. | |

FOREIGN PATENT DOCUMENTS

DE 3939524 * 6/1990

* cited by examiner

*Primary Examiner* — Dennis H Pedder
(74) *Attorney, Agent, or Firm* — Fitch, Even, Tabin & Flannery LLP

(57) ABSTRACT

A vehicle roof having a roof structure with a roof opening, which, by a roof opening mechanism, can be closed or at least partially uncovered as desired, said roof opening mechanism being designed as an interchangeable insert. Additionally, a roof opening mechanism is proposed, being designed as an interchangeable insert, for unlockable fixation at a roof structure of a vehicle roof, and comprising a frame, which can be placed upon an edge region of the roof structure, said edge region limiting a roof opening.

6 Claims, 18 Drawing Sheets

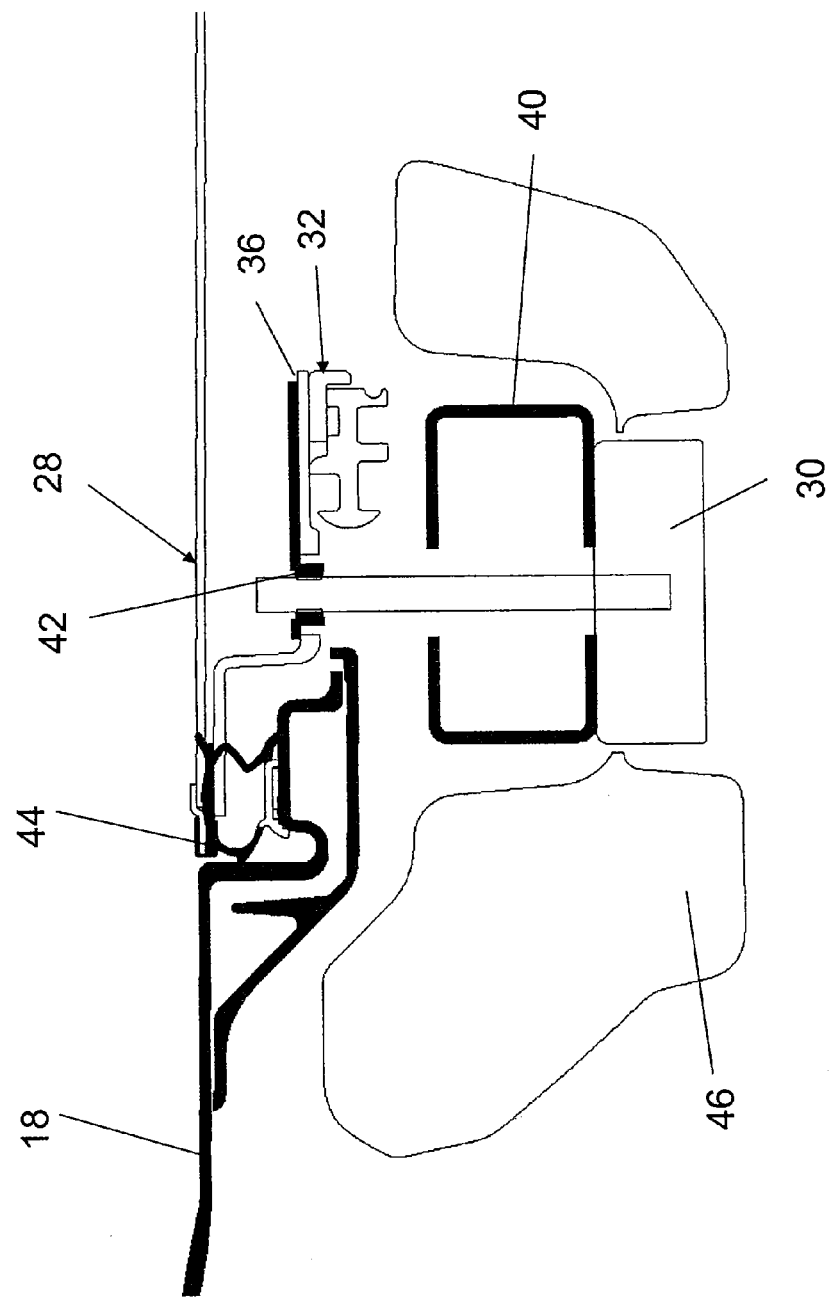

VEHICLE ROOF AND ROOF OPENING MECHANISM

TECHNICAL FIELD

This disclosure relates to a vehicle roof having a roof structure with a roof opening, and in particular a vehicle roof structure having a roof opening mechanism configured as an interchangeable insert, which, can be closed or at least partially uncovered as desired.

BACKGROUND

Motor vehicles having vehicle roofs of the above-described type are known from practice and are for example designed as an off-road vehicle or SUV (Sports Utility Vehicle). The vehicle roof, which is usually a fixed-roof, includes a roof opening above a driver's seat and a front passenger seat, which roof opening can be closed or at least partially uncovered by a sliding roof arrangement. The sliding roof arrangement is integrated into the roof structure in a permanent fashion and has drive kinematics, which are guided in guide rails being arranged on both sides of the roof opening. The drive kinematics usually have a complex heavy structure, which is reflected in the overall costs of the vehicle roof and of the relevant motor vehicle.

SUMMARY

Vehicle roofs are described whose roof opening can be used as desired by the user.

Therefore, a vehicle roof is proposed having a roof structure with a roof opening having a roof opening mechanism which can be closed or at least partially uncovered as desired, said roof opening mechanism being designed as an interchangeable insert. wherein the interchangeable insert comprises a base frame, which follows an edge of the roof opening, wherein the roof opening mechanism further comprises a fabric covering element, which, by at least one tensioning bow pivotable with respect to the base frame, is displaceable between a closed position for covering the roof opening and an uncovering position for uncovering the roof opening.

According to one approach, the roof opening mechanism in the proposed vehicle roof can be installed or removed by a user of the relevant vehicle if required or desired. Manipulation of the roof structure itself, onto which the interchangeable insert can be placed, is not required hereunto. Instead, the proposed vehicle roof can be a variable system in which the roof opening can either be provided with a roof opening mechanism or, alternatively, with a rigid element, or in which the roof opening can also be left completely open. A rigid roof element, which is designed in one piece or in several pieces, can be fixed to the roof structure via the same links as the roof opening mechanism being designed as an interchangeable insert.

The interchangeable insert is provided with a base frame, which follows an edge of the roof opening. The base frame constitutes the element of the interchangeable insert that serves for linking the roof opening mechanism to the roof structure. This means that the base frame forms a link between the roof opening mechanism and the roof structure or vehicle structure. In principle, the base frame can be realized as a closed frame preferably having four legs or also as an open frame, for example having three legs, e.g., it can have a roughly "U"-shaped layout.

In order to make it as easy as possible for users of the relevant vehicle to install the roof opening mechanism at the roof structure or to remove the roof opening mechanism from the roof structure, the base frame is preferably attached to the roof structure via fixation elements being manually unlockable. For example, the manually unlockable fixation elements are handle screws, which reach through the roof structure from below. Preferably, in the region of lateral roof beams, two handle screws in each instance reach through the roof structure from below, in order to reach into corresponding screw threads of the base frame from below, said base frame being arranged on the roof structure.

The roof opening mechanism comprises a fabric covering element, which, by at least one tensioning bow pivotable with respect to the base frame, is displaceable between a closed position for covering the roof opening and an uncovering position for uncovering the roof opening. This means that the tensioning bow constitutes the control element of the roof opening mechanism that is then designed in the manner of a folding roof. The position of the tensioning bow prescribes the position and the tensioning state of the fabric covering element.

The tensioning bow is in particular mounted at the base frame of the interchangeable insert, to be more precise, in relation to a longitudinal center plane of the roof, it is preferably on each of its two sides mounted via a tensioning bow portion being articulated to a corresponding leg of the base frame.

In order to be able to secure the fabric covering element in its closed position, in a special embodiment, the tensioning bow, in the closed position, is adjacent to a front edge of the roof opening in order to be secured at the roof structure by a closing mechanism. The roof structure also comprises a front apron of the relevant vehicle, which forms an upper frame leg of a windshield frame of the relevant motor vehicle.

In order to be able to fold the fabric covering element in a controlled fashion in the uncovering position, the tensioning bow, in a special embodiment, is coupled to a pivotable auxiliary tensioning bow. The auxiliary tensioning bow can be fixed to the fabric covering element or can also only loosely abut on the fabric covering element from below, or it can also reach into a pocket of the fabric covering element.

In order to be able to move the tensioning bow and the auxiliary tensioning bow when they are coupled, the tensioning bow, in a preferred embodiment, in relation to a vertical longitudinal center plane of the roof, is on each of its two sides connected to the auxiliary tensioning bow via a coupling rod.

In accordance with a further aspect of the present disclosure, a roof opening mechanism is proposed, being designed as an interchangeable insert, for unlockable fixation at a roof structure of a vehicle roof, and comprising a frame, which can be placed onto an edge region of the roof structure, said edge region limiting a roof opening. The roof opening mechanism can present the features that have previously been described in conjunction with the vehicle roof.

The frame of the roof opening mechanism can be designed so as to be closed or it can also have only three legs, via which it can be linked to the roof structure, i.e. it can have a U-shaped layout in the broadest sense.

According to a further aspect of the present disclosure, a vehicle roof is proposed, comprising a roof structure having a roof opening, which, as desired, can be provided with a roof opening mechanism, which is designed as an interchangeable insert of the previously described type, or with a rigid roof element being designed in one part or in several parts.

Further advantages and advantageous configurations of the subject-matter of the invention can be taken from the description, from the drawing and from the claims.

BRIEF DESCRIPTION OF THE DRAWING

In the drawing, a motor vehicle having a vehicle roof, including a roof opening, is illustrated in a schematically simplified fashion and will be explained in more detail in the following description.

FIG. 18 shows a sectional illustration through a rear frame leg of the roof opening mechanism in the state in which it is installed on the vehicle structure.

DETAILED DESCRIPTION OF A PREFERRED EMBODIMENT

Figure 1:
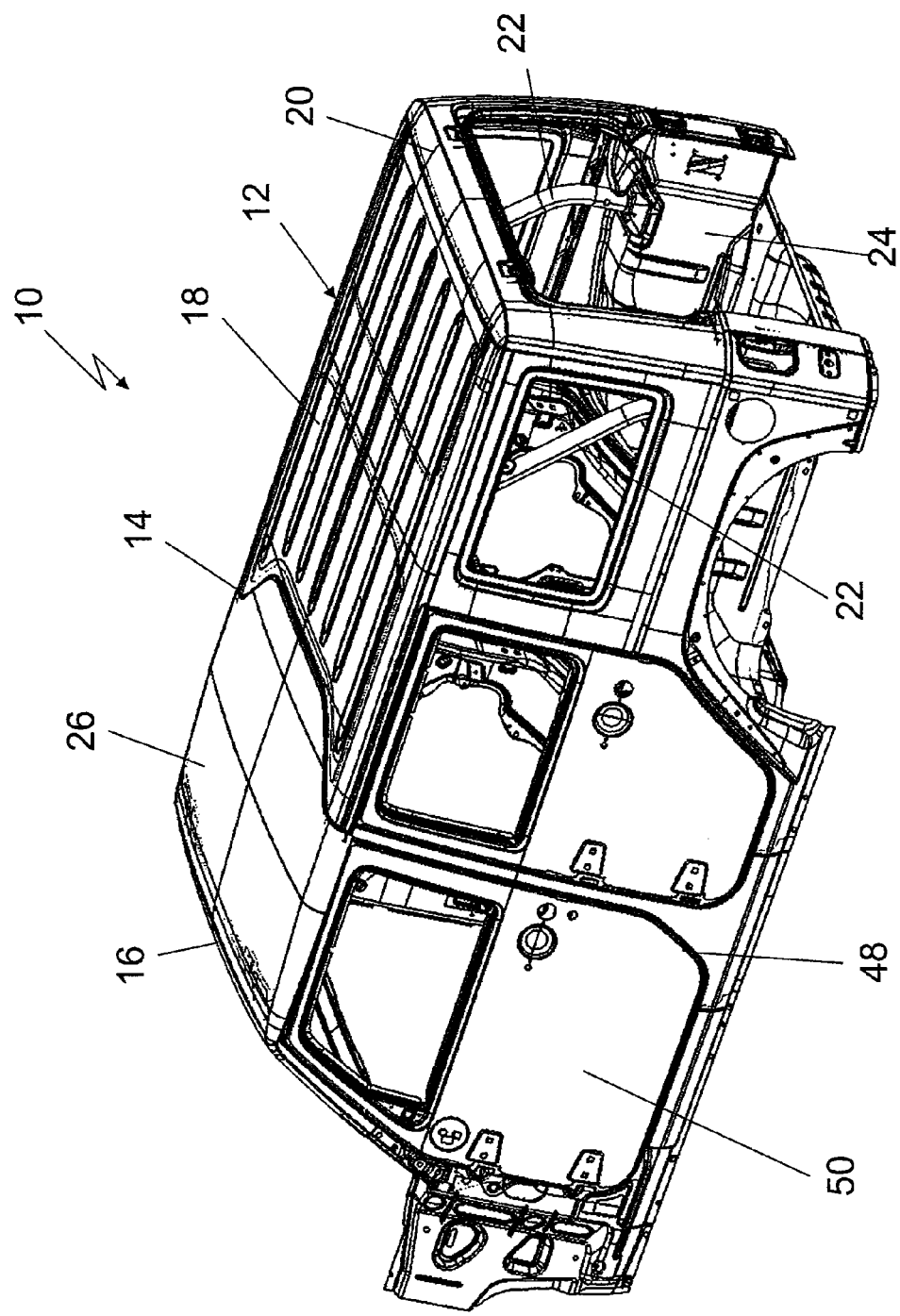
FIG. 1 shows a perspective view of a vehicle structure having a roof opening, which is closed by a rigid element.
Figure 2:
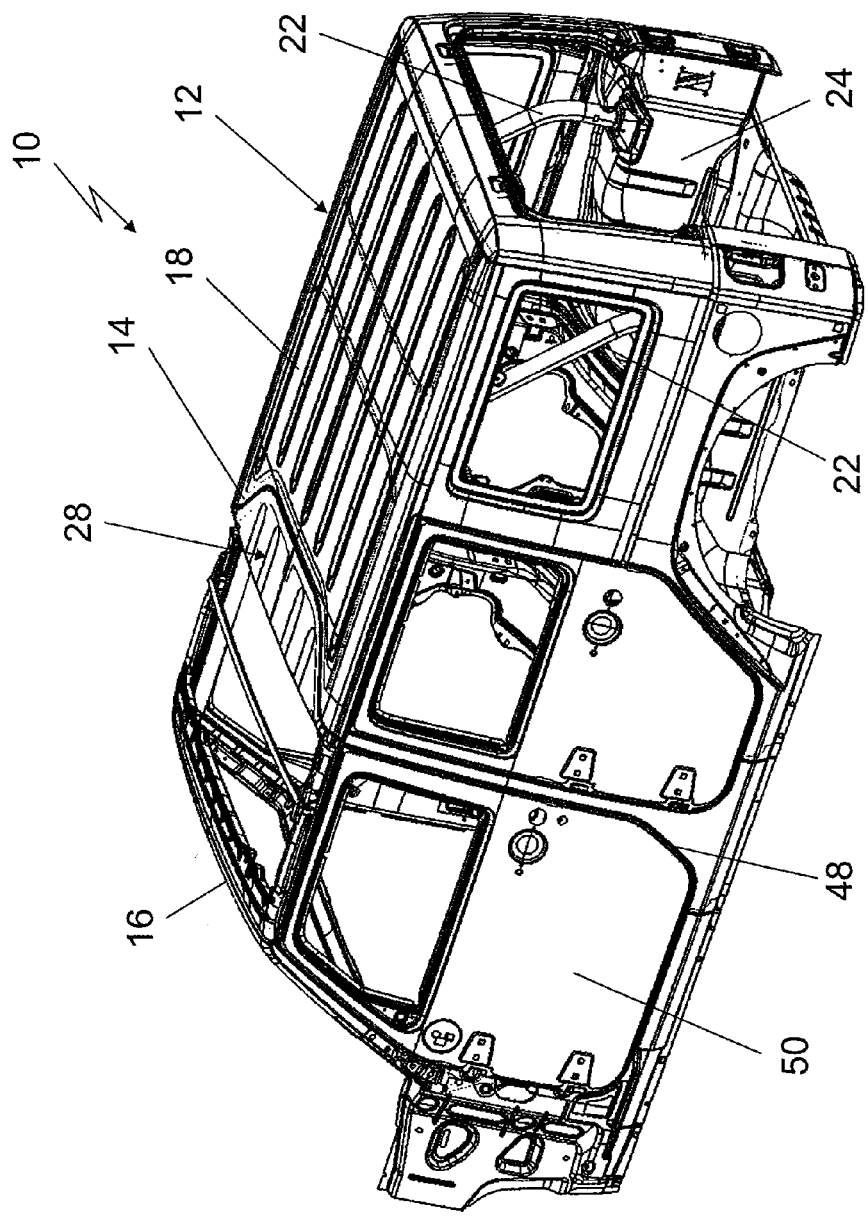
FIG. 2 shows a view that is similar to FIG. 1, but with a roof opening mechanism in the closed position thereof.
Figure 3:
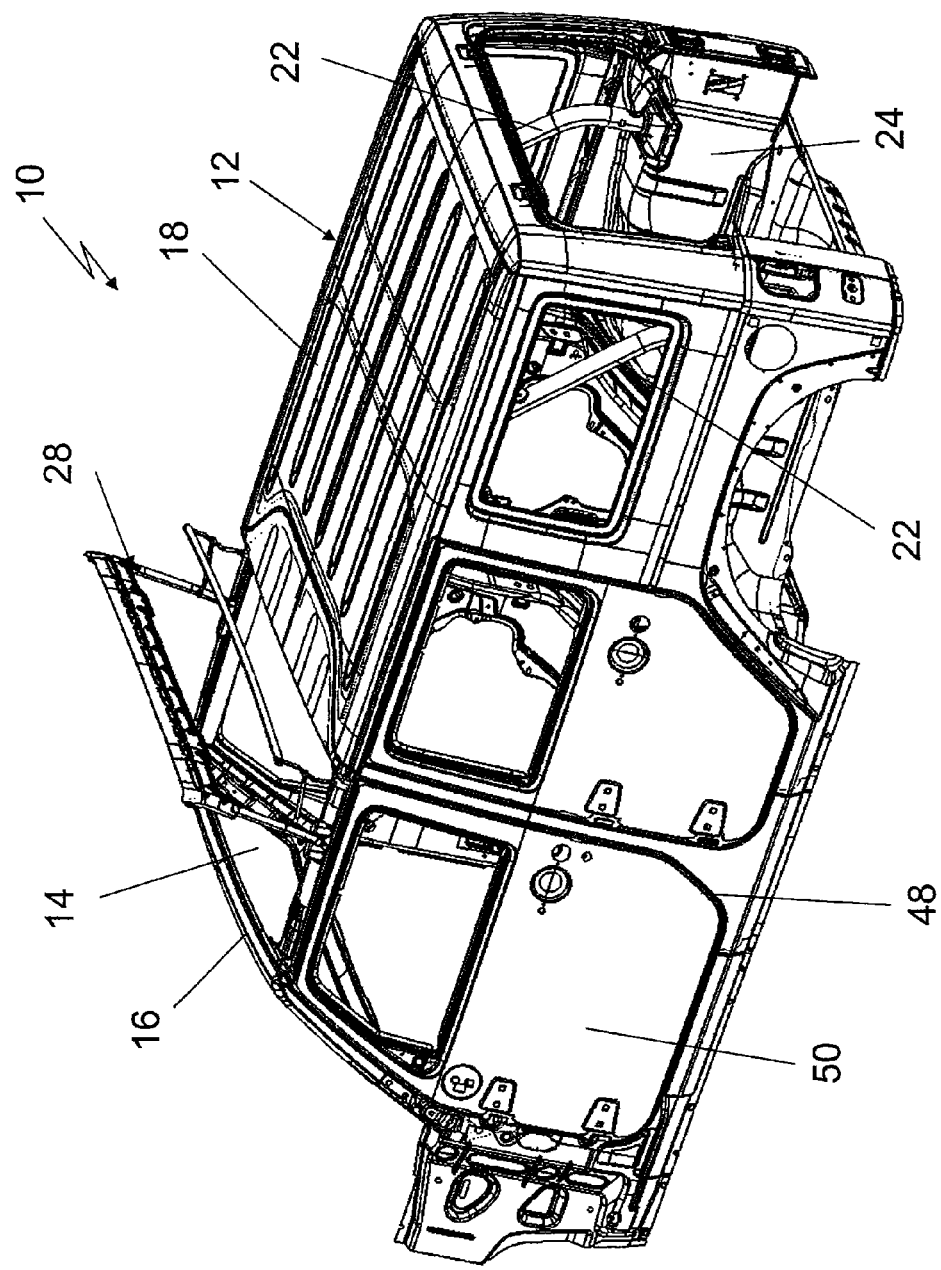
FIG. 3 shows a view that is similar to FIG. 2, but in an intermediate position of the roof opening mechanism.
Figure 4:
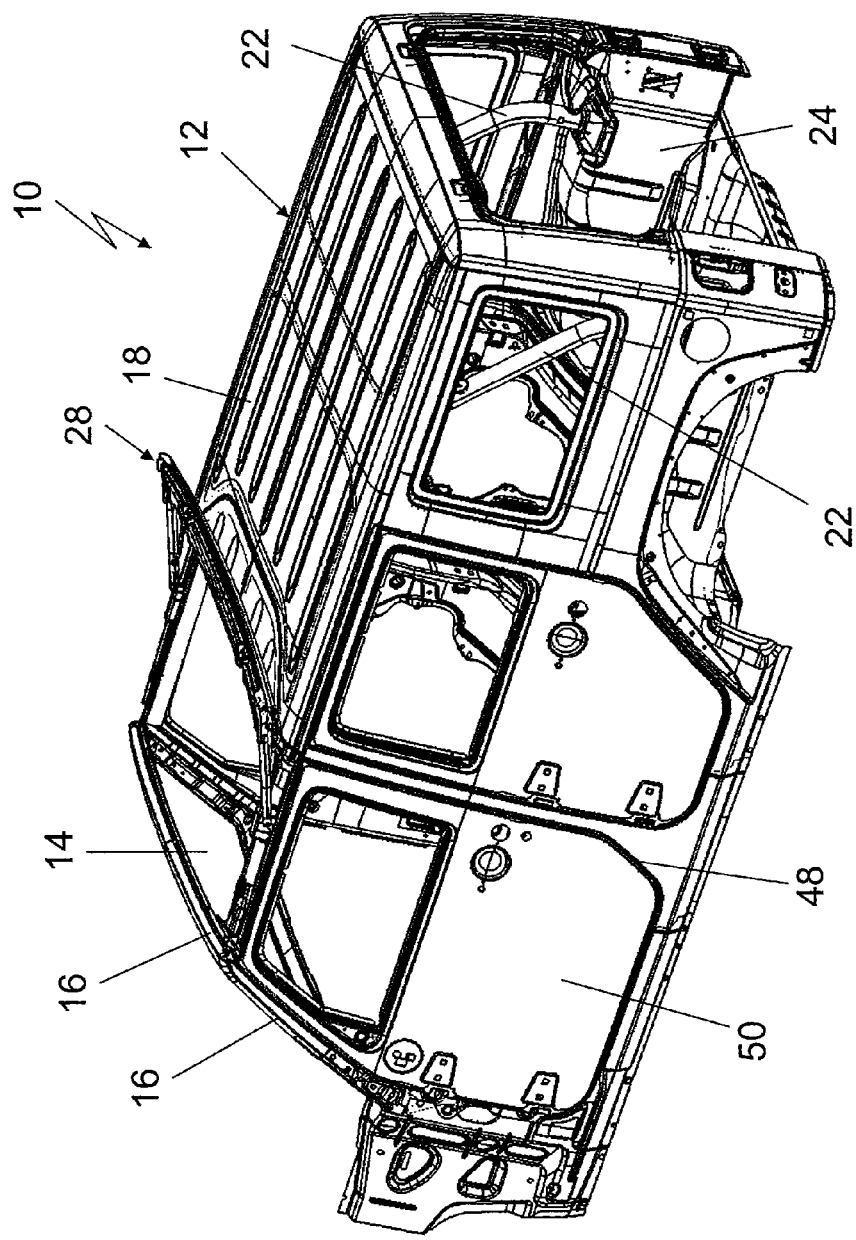
FIG. 4 equally shows a view that is similar to FIG. 2, but in an open position of the roof opening mechanism.
Figure 5:
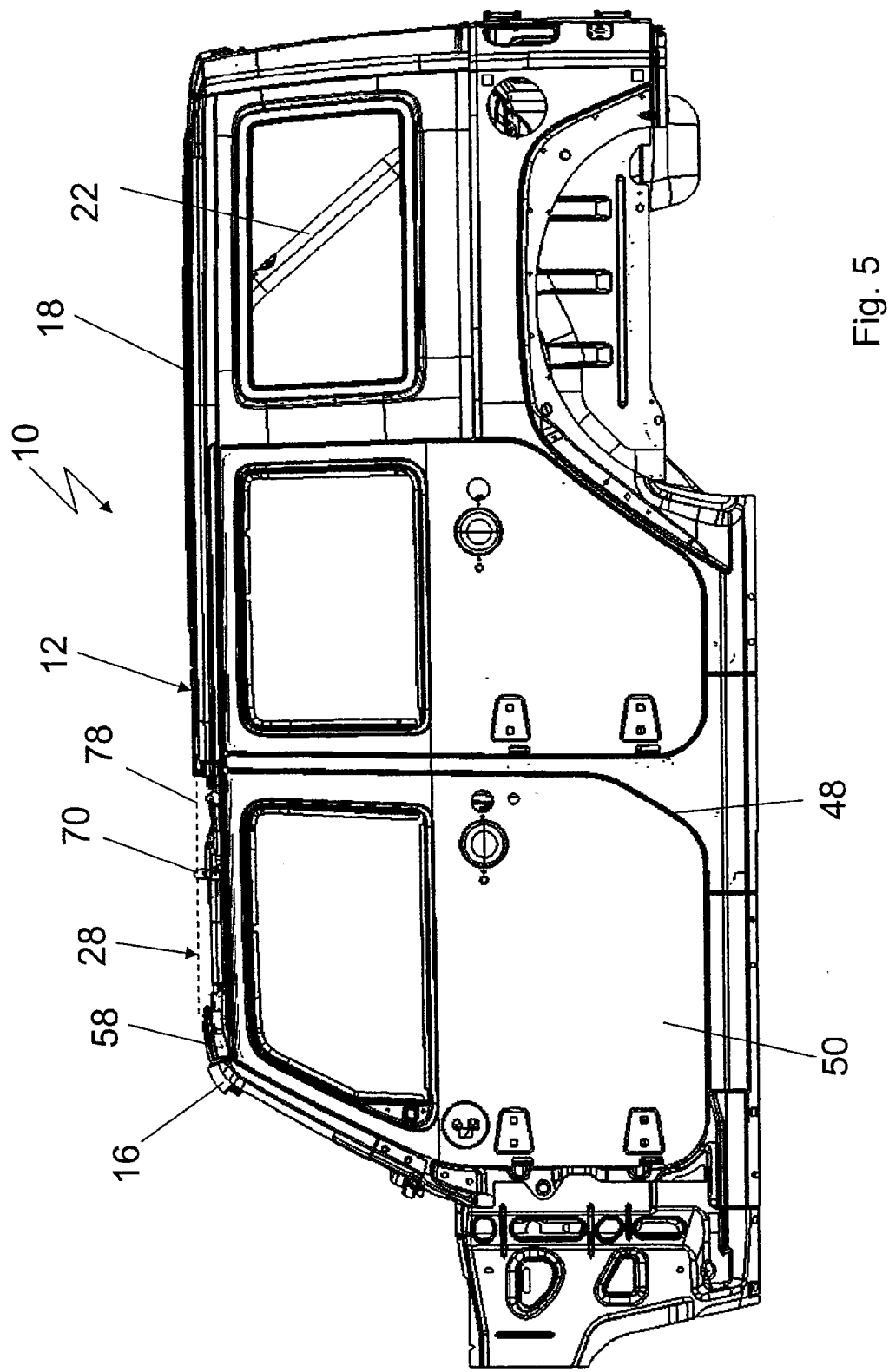
FIG. 5 shows a side view of the vehicle structure with the roof opening mechanism in the closed position thereof.
Figure 6:
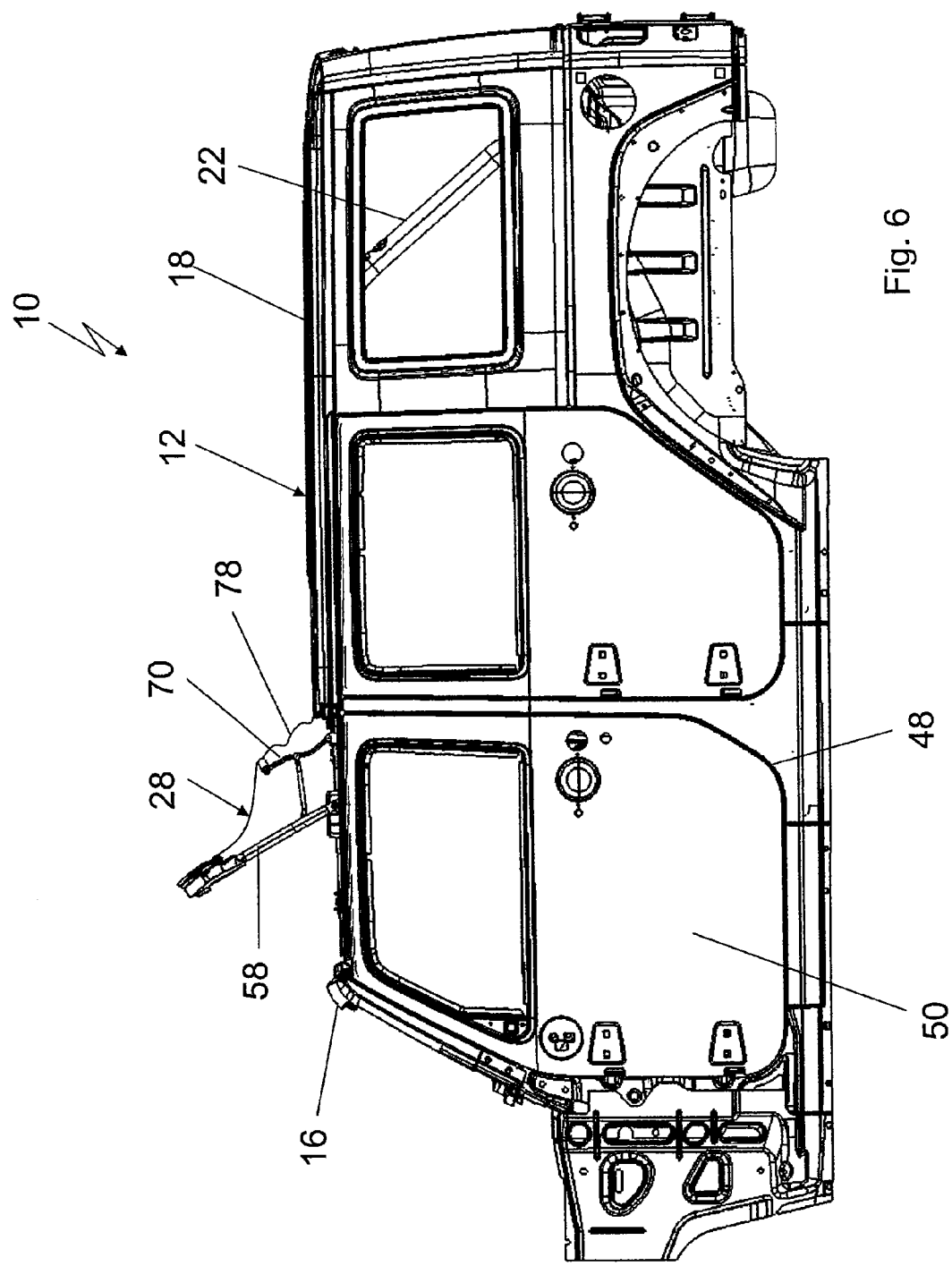
FIG. 6 shows a view that is similar to FIG. 5, but in the intermediate position of the roof opening mechanism.
Figure 7:
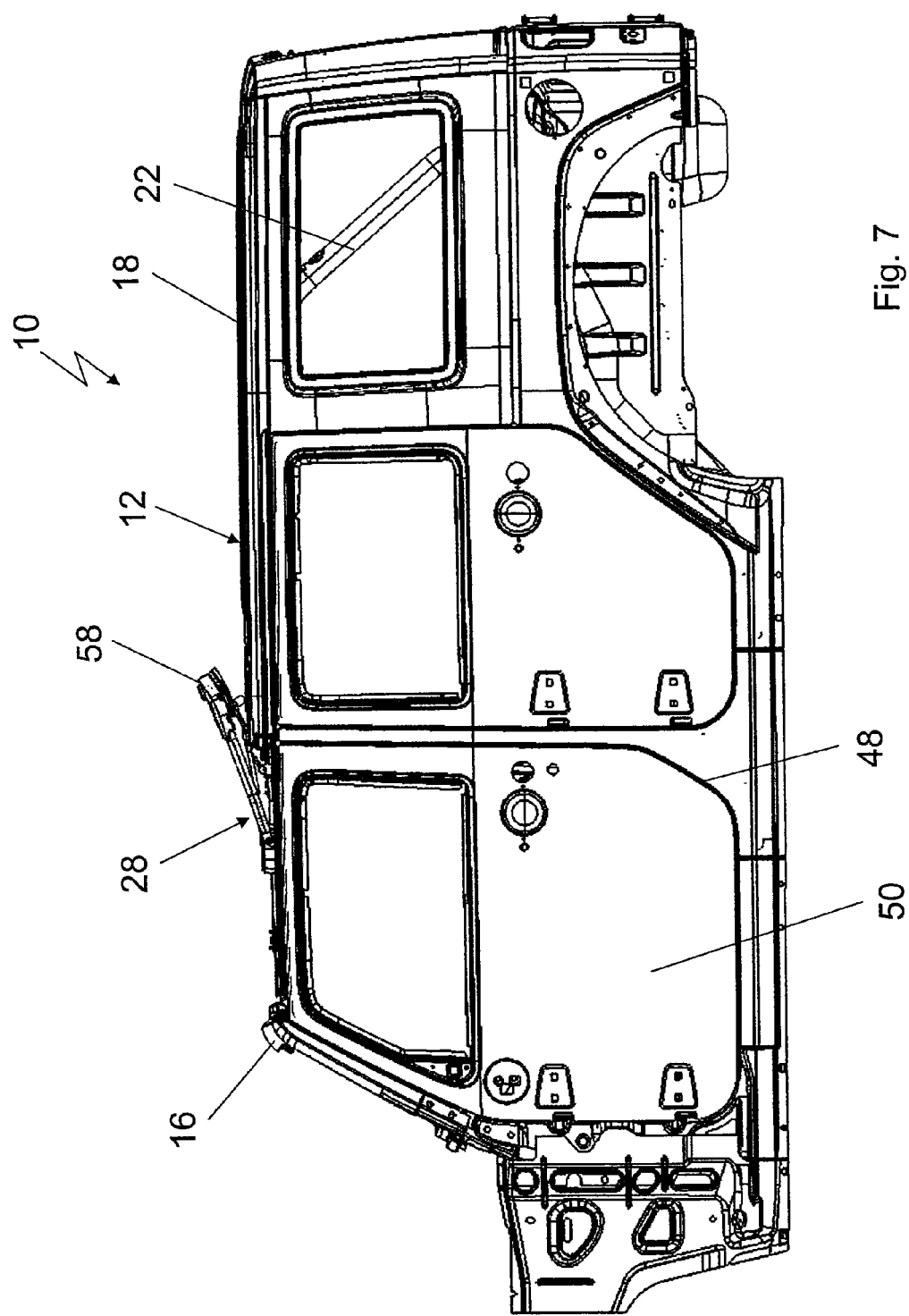
FIG. 7 shows a view that is similar to FIG. 5, but in the open position of the roof opening mechanism.
Figure 8:
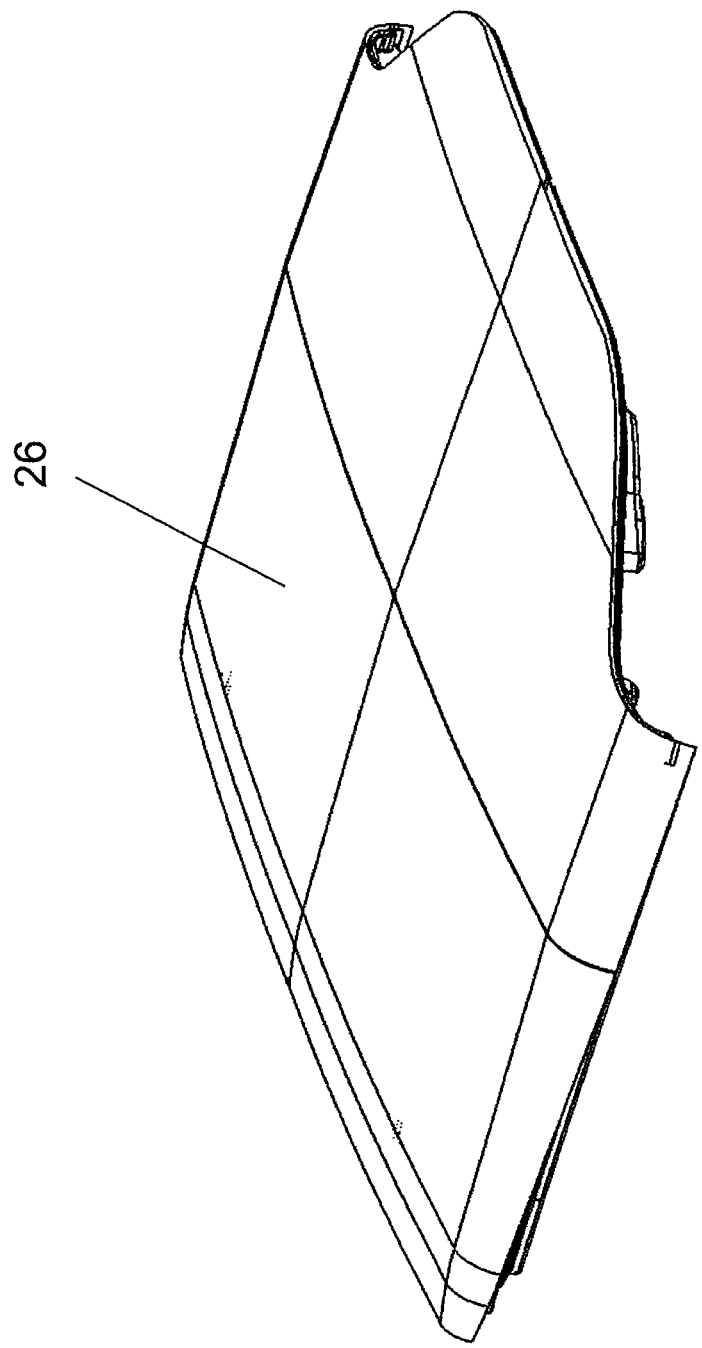
FIG. 8 shows the rigid element according to FIG. 1 on its own.
Figure 9:
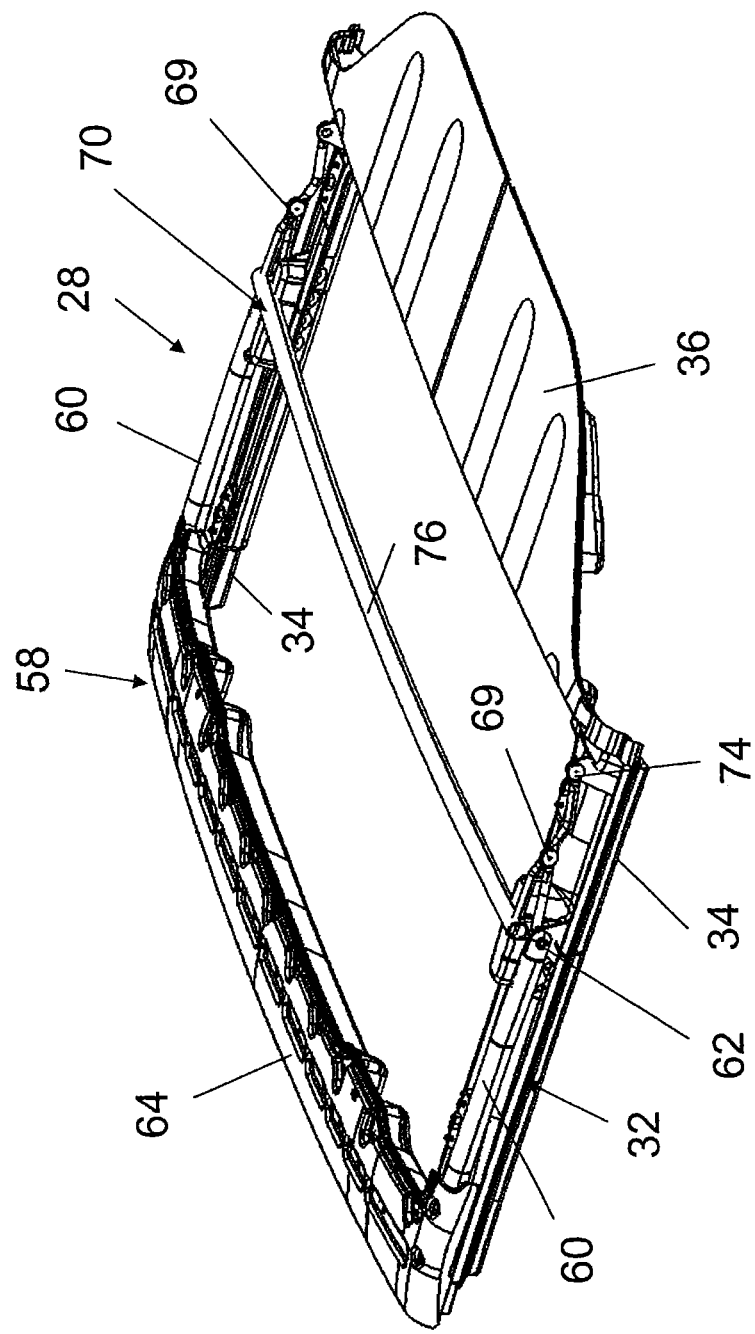
FIG. 9 shows a perspective top view onto the roof opening mechanism on its own, in the closed position thereof.
Figure 10:
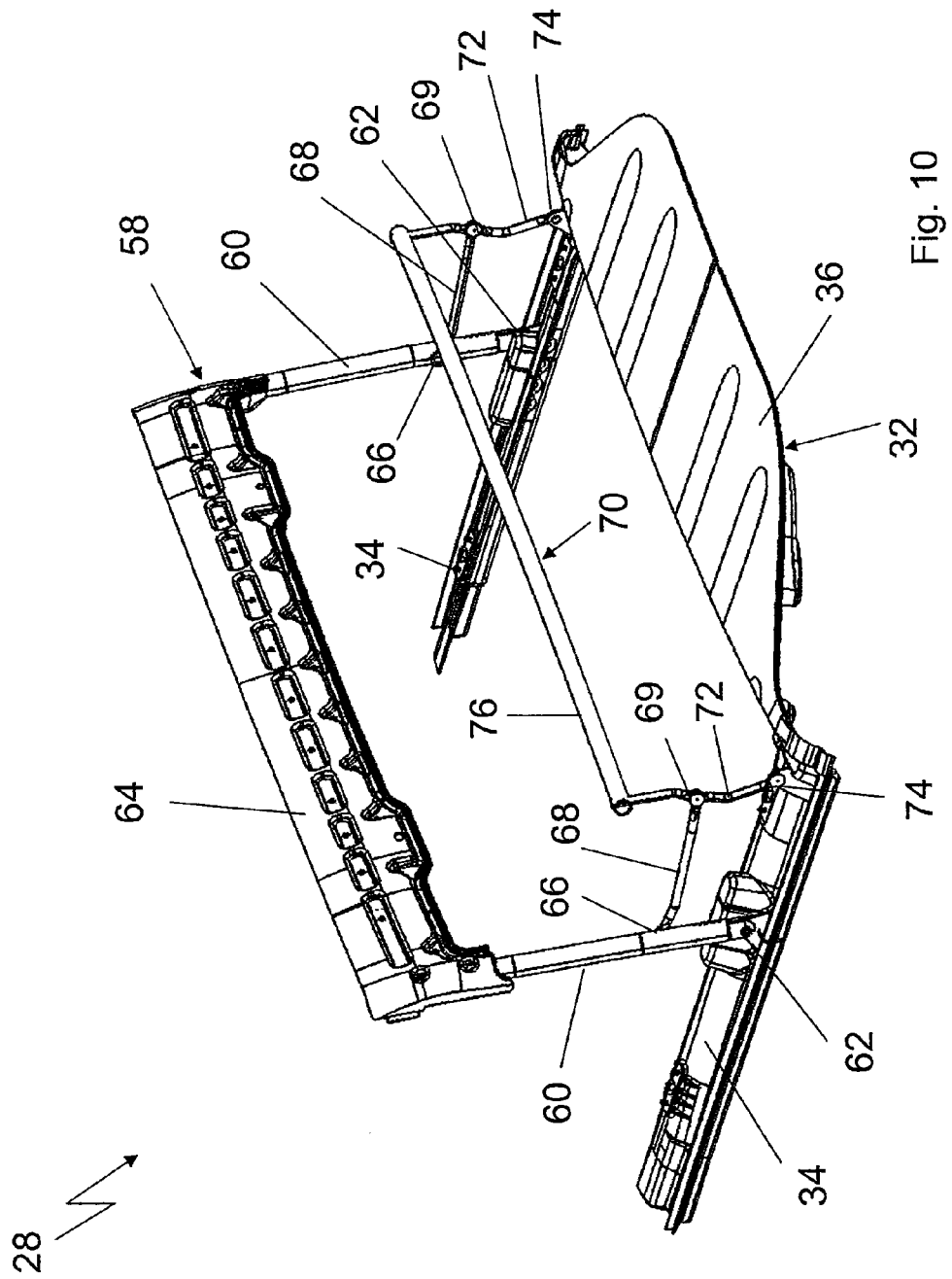
FIG. 10 shows a view of the roof opening mechanism that is similar to FIG. 9, but in the intermediate position.
Figure 11:
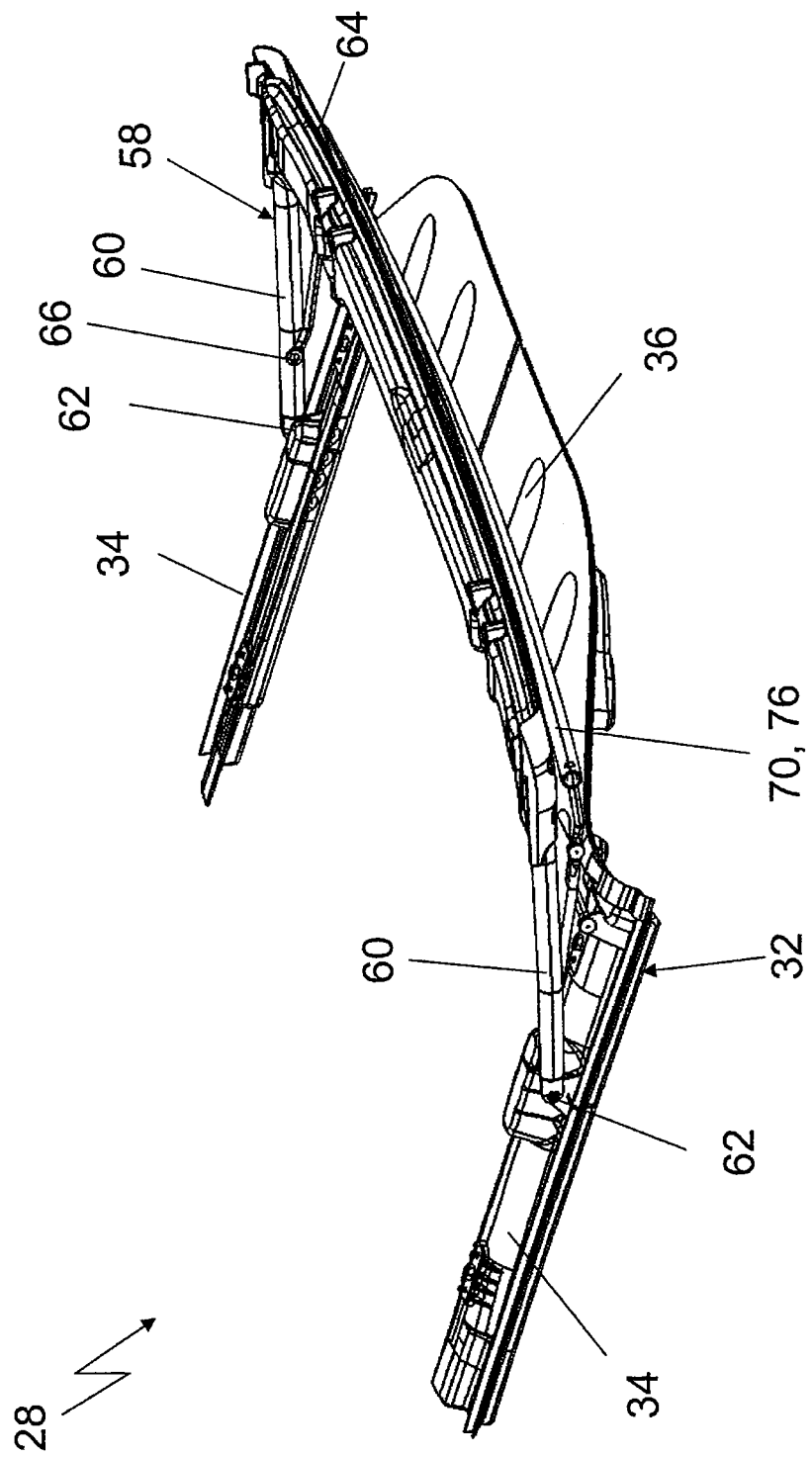
FIG. 11 equally shows a view of the roof opening mechanism that is similar to FIG. 9, but in the open position.
Figure 12:
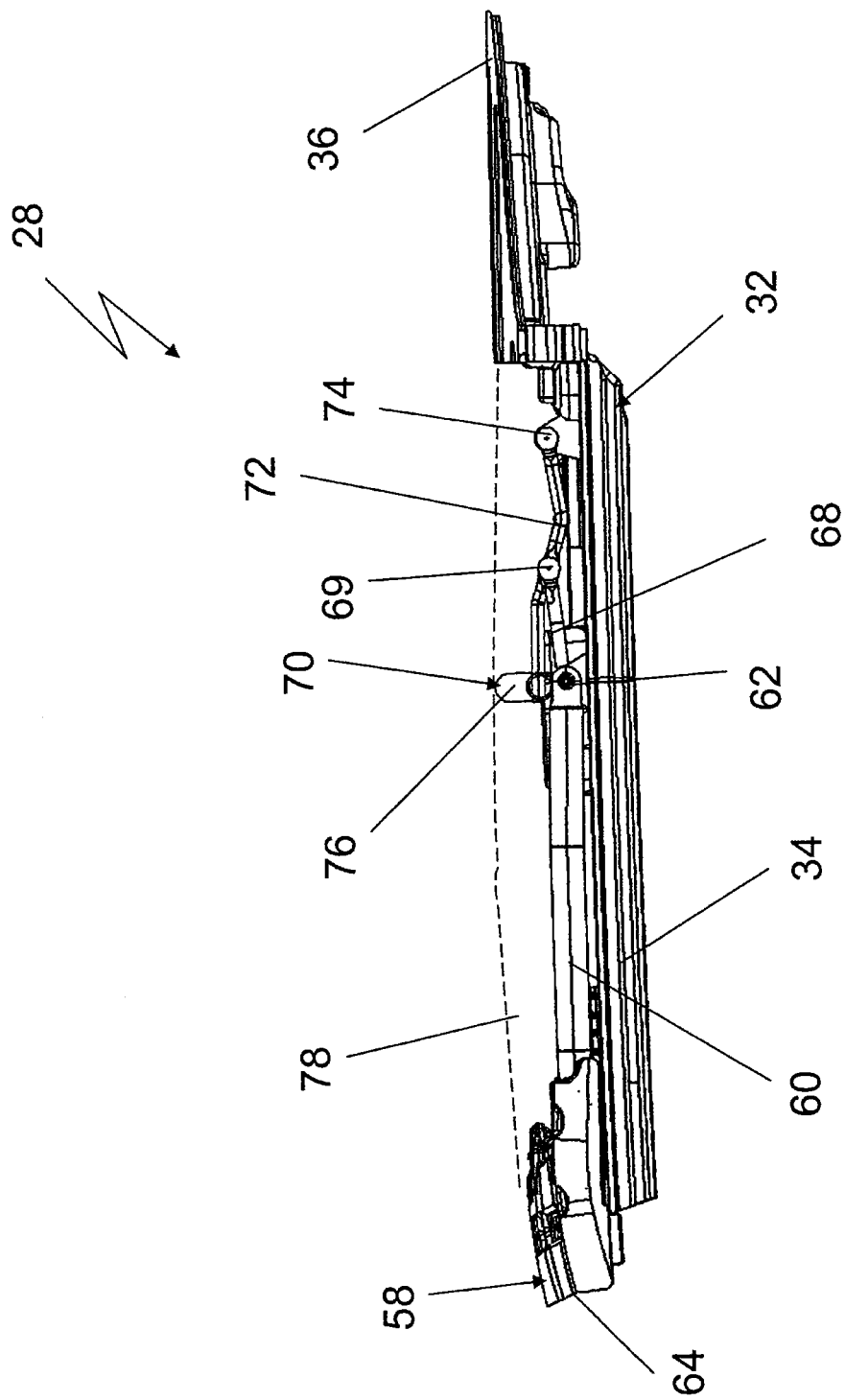
FIG. 12 shows a side view of the roof opening mechanism in the closed position thereof.
Figure 13:
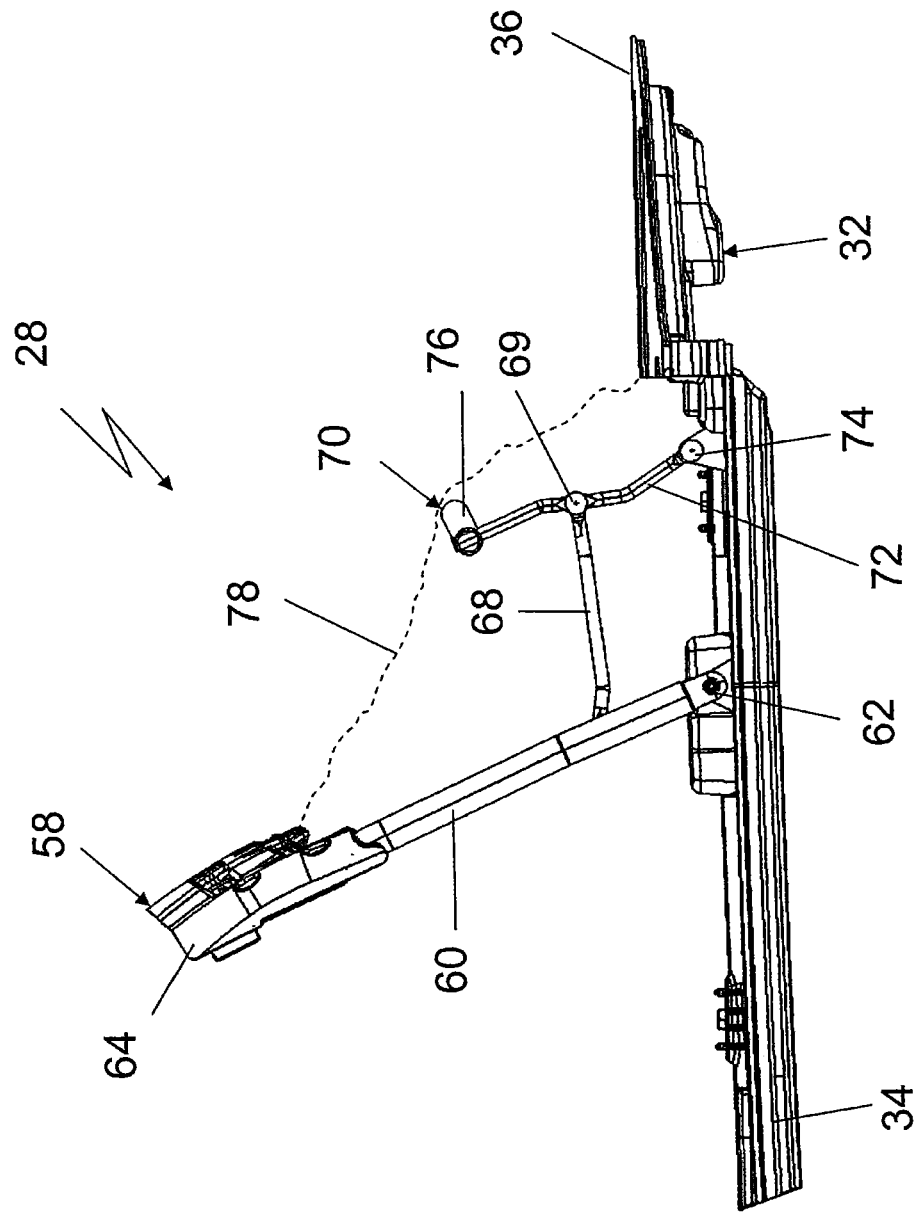
FIG. 13 shows a view of the roof opening mechanism that is similar to FIG. 12, but in the intermediate position.
Figure 14:
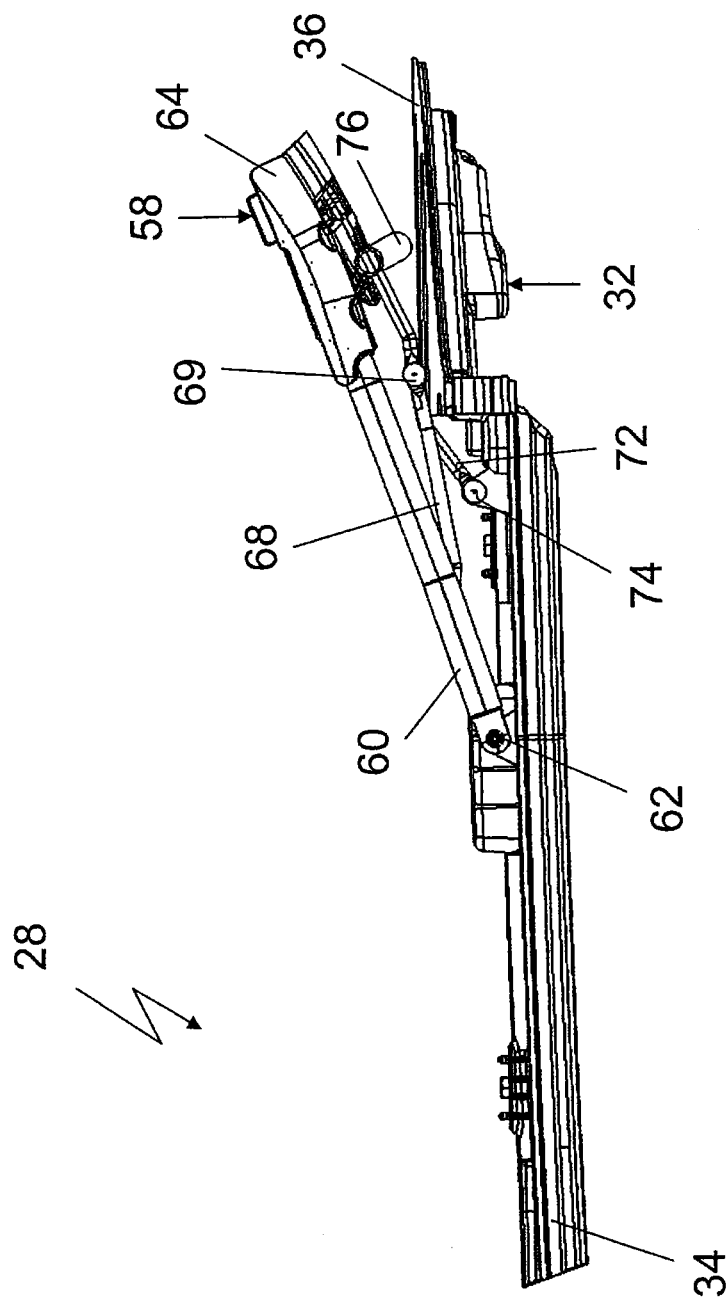
FIG. 14 shows a view of the roof opening mechanism that is similar to FIG. 13, but in the open position.
Figure 15:
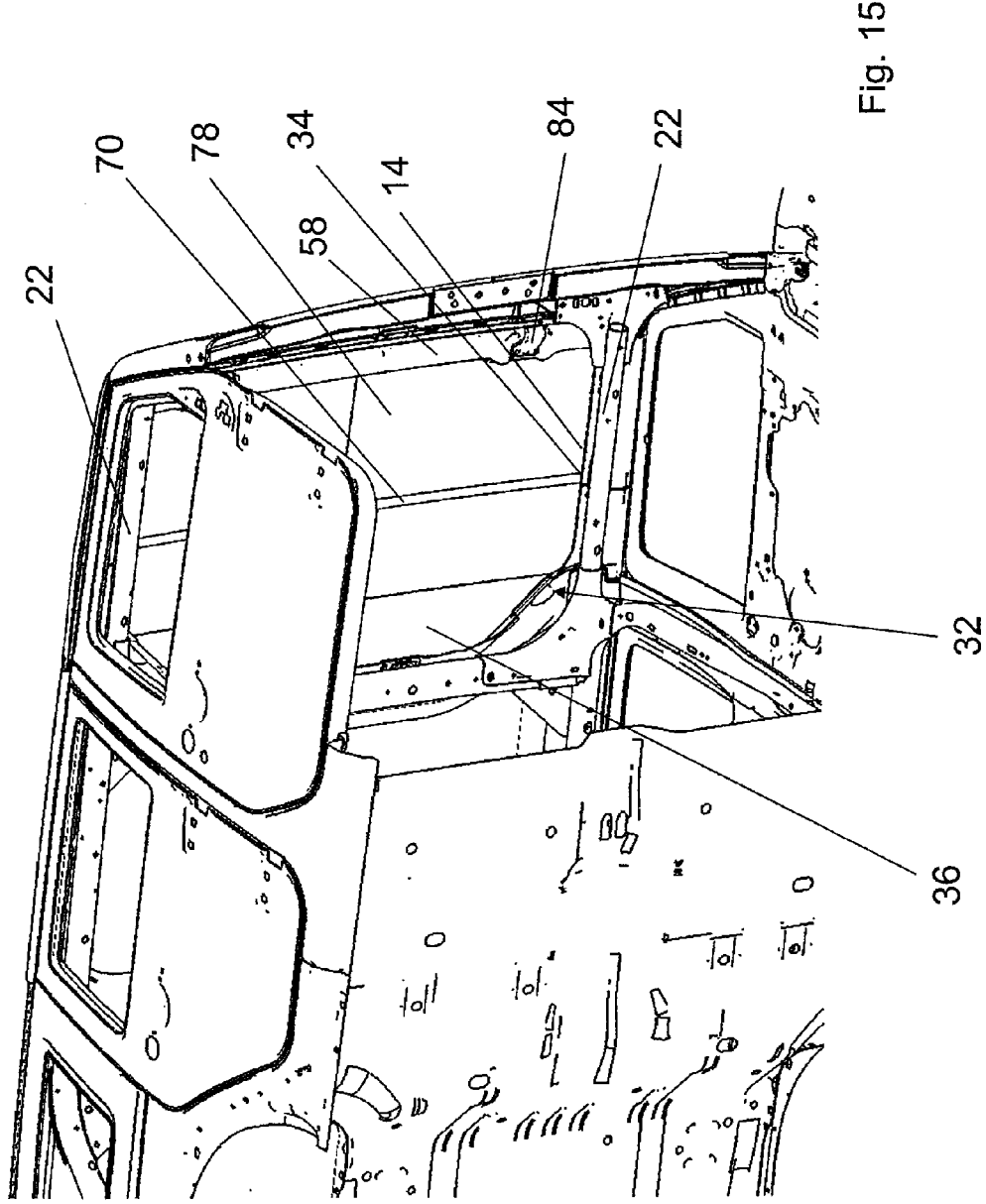
FIG. 15 shows an inside view of the vehicle structure according to FIG. 2, in the closed position of the roof opening mechanism.

In the drawings, a vehicle structure 10 is illustrated, which is part of a passenger car being designed as an all-terrain vehicle and which includes a vehicle roof 12, which is provided with a roof opening 14, said roof opening being designed above a driver's seat and a front passenger seat. The roof opening 14, with its front edge, is adjacent to a front apron 16, which forms an upper frame leg of a windshield frame, said upper frame leg extending in the transverse direction of the vehicle. In the rear, the roof opening 14 is adjacent to a fixed-roof portion 18, which extends up to a rear roof edge 20. In relation to a vertical longitudinal center plane of the roof, the roof opening 14 is laterally in each instance limited by a tube-like longitudinal roof beam 22, which can be part of a rollover protection mechanism of the vehicle structure 10 and which is to be considered to be part of the roof structure here. The longitudinal roof beam 22 that is arranged on the left in relation to the forward direction of travel can be taken from FIG. 17 that is a sectional illustration. In FIGS. 1 to 7, rear elongations of the two longitudinal roof beams 22 are illustrated, which extend diagonally downwards into a rear loading space 24 of the vehicle structure 10.

In accordance with FIG. 1, the roof opening 14 is closed by a rigid roof element 26, which reaches up to the front apron 16 in the front and up to the fixed-roof portion 18 in the rear. In the edge regions being arranged on the side in relation to the vertical longitudinal center plane of the roof, the rigid roof element 26 covers the two longitudinal roof beams 22. Laterally, the rigid roof element 26, on each of its two sides, forms an upper limitation of a door cut-out 48 for a side door 50 of the vehicle structure 12.

The rigid roof element 26 is secured in its installed position being illustrated in FIG. 1 by handle screws, two of which in each instance reach through the longitudinal roof beams 22 from below and two of which reach through the rear fixed-roof portion 18 from below, said handle screws reaching into a corresponding screw thread of the rigid roof element 26 from below. In addition, the rigid roof element 26 is fixed to the front apron 16 by suitable closing lugs.

Figure 16:
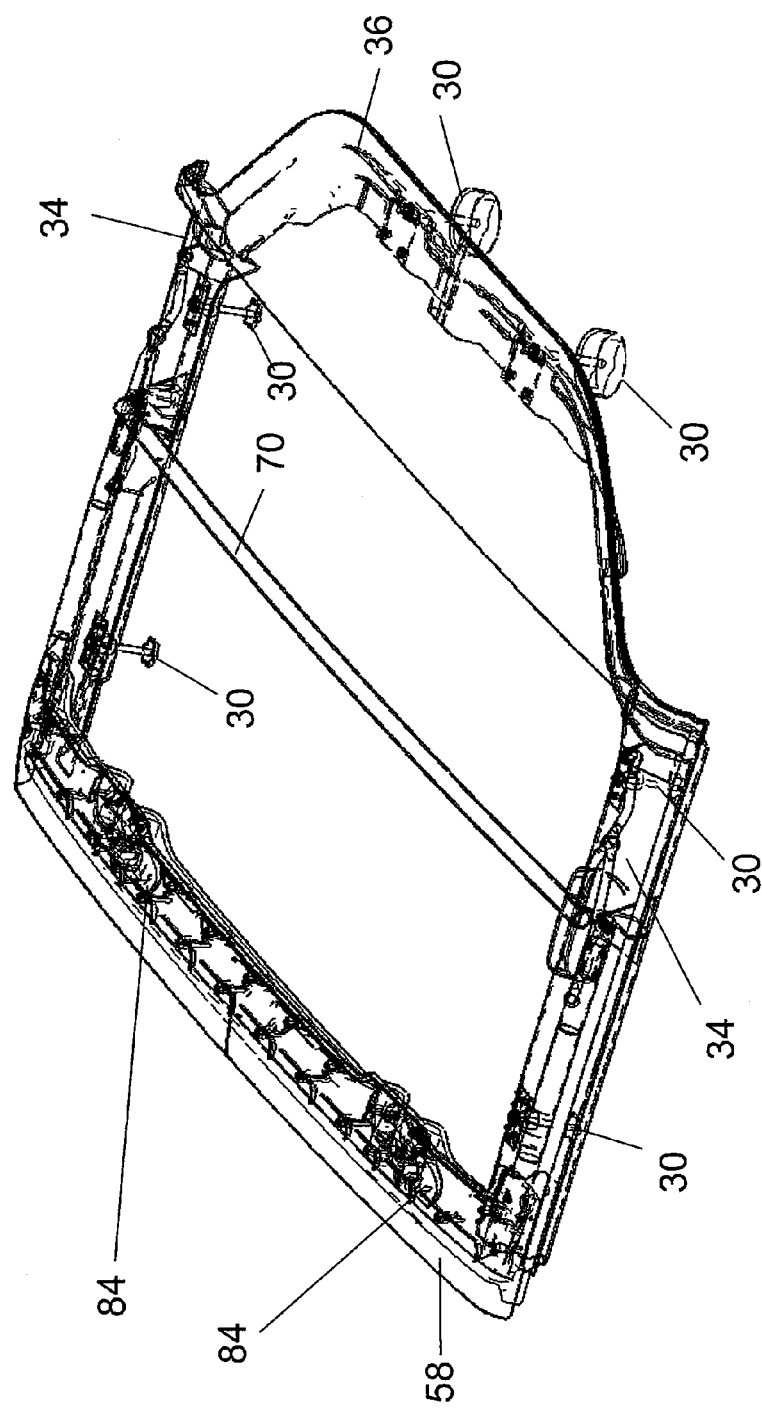
FIG. 16 shows a perspective view of a frame of the roof opening mechanism together with fixation elements.
Figure 17:
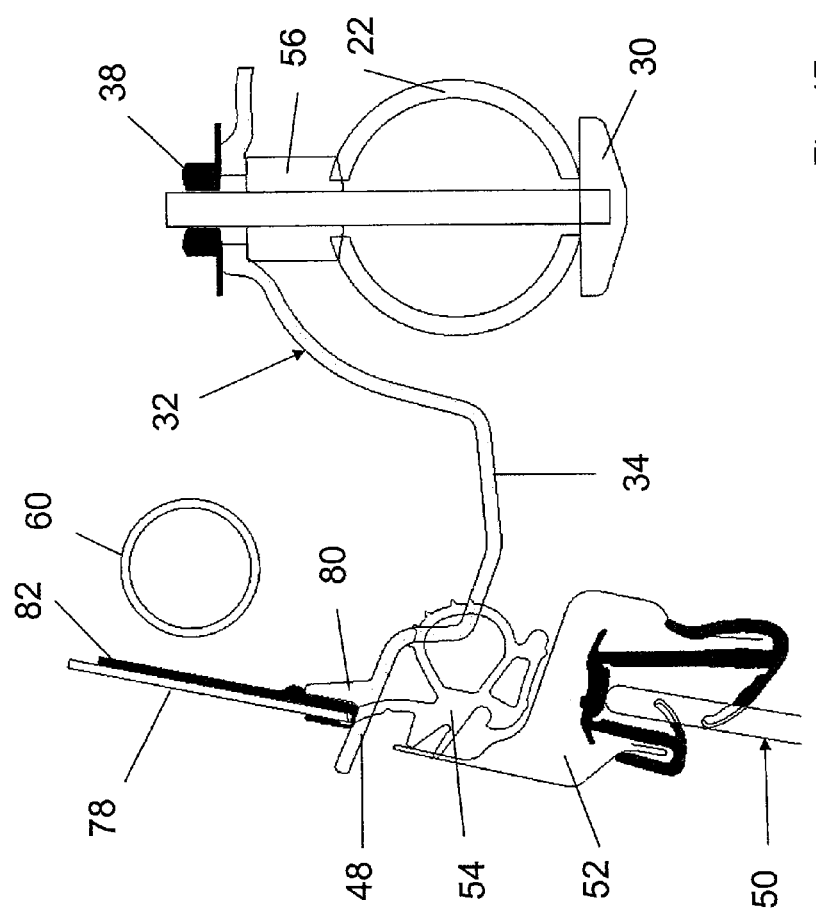
FIG. 17 shows a sectional illustration through a lateral beam of the vehicle structure according to FIG. 2, with the roof opening mechanism being installed in the region of a fixation element.

As it can be taken from FIGS. 2 to 7, the roof opening 14 can, as an alternative to the rigid roof element 26, be provided with a roof opening mechanism 28, being designed as an interchangeable insert, which, as it can be taken from FIGS. 16 to 18, can be fixed to the roof structure by several handle screws 30. The handle screws 30 are manually unlockable fixation elements, which reach through the roof structure from below and reach into corresponding screw threads of the roof opening mechanism 28 from below. The handle screws 30 correspond to the handle screws by which the rigid roof element 26 is secured in its installed position.

As it can in particular be taken from FIGS. 9 to 14, the roof opening mechanism 28 being designed as an interchangeable insert includes a base frame 32, which has an at least nearly U-shaped layout and which consists of two longitudinal legs 34 extending in the longitudinal direction of the vehicle and of a transverse leg 36 connecting the two longitudinal legs 34 to each other at their rear ends. The longitudinal legs 34 have one free face side in the front, respectively, which face side is adjacent to the front apron 16 of the roof structure or vehicle structure 10 in the installed position being illustrated in FIGS. 2 to 7. Additionally, the longitudinal legs 34 in each instance are positioned on one of the longitudinal roof beams 22. The roof opening mechanism 28 is fixed to the roof structure via the base frame 32. This means that the base frame forms a link to the roof structure.

As it can be taken from FIGS. 16 to 18, two of the handle screws 30 previously having been mentioned also with respect to the rigid roof element 26, for fixing the roof opening mechanism to the roof structure, reach through one longitudinal roof beam 22, respectively, from below in order to then reach into a corresponding screw thread 38 from below, which screw thread is designed at the relevant longitudinal leg 34 of the base frame 32. Additionally, between the longitudinal roof beams 22 of the roof structure or vehicle structure 10 and the respective longitudinal leg of the base frame 32, in the region of the handle screws 30, one spacer 56, respectively, is arranged, the respective handle screw 30 equally reaching through said spacer.

Two further handle screws 30 reach through a transverse roof beam 40 from below, in order to then reach into a corresponding screw thread 42 from below, which screw thread is designed at the transverse leg 36 of the frame 32. Here, the transverse leg 36 rests on a seal 44, which is designed at the front edge of the fixed-roof portion 18. The handles of the handle screws 30 being accessible from the vehicle interior in the installed position can laterally be encircled by an interior paneling 46 of the roof structure. Alternatively, the base frame 32 might be fixed to the front apron and to B-pillars of the vehicle structure. Then, no longitudinal roof beams are required for fixing the base frame.

The longitudinal legs 34 of the base frame 32, which rest on the longitudinal roof beams 22, form one upper limitation, respectively, of the door cut-out 48, which can be closed by the respective side door 50 of the vehicle structure 10. The side door 50 has an upper frame piece 52, at which a seal 54 is arranged, which, in the closed position of the door 50, interacts with a corresponding sealing surface at the bottom side of the respective longitudinal leg 34 of the base frame 32.

The roof opening mechanism 28 comprises a main tensioning bow 58, which is designed so as to be substantially U-shaped and which is articulated to the longitudinal legs 34 of the base frame 32 by its free legs 60 via hinge points 62. The free legs 60 of the main tensioning bow 58, at their ends facing away from the hinge points 62, are connected to each other via a transverse leg, which, in the closed position being illustrated in FIGS. 2, 5 and 9, forms a front edge of the roof opening mechanism 28, said edge being adjacent to the front apron 16 of the vehicle structure 10. The transverse leg 64 constitutes a front bow of the roof opening mechanism 28.

The two free legs 60 of the main tensioning bow 58 are in each instance connected to a coupling link 68 via a hinge point 66, said coupling link being articulated to a U-shaped auxiliary tensioning bow 70 via a hinge point 69. The auxiliary tensioning bow 70, on each of its two sides, includes a leg 72, which is articulated in the rear end region of the respective longitudinal leg 34 of the base frame 32 via a hinge point 74. The two legs 72, at their ends facing away from the hinge points 74, are connected to each other via a transverse leg 76 constituting an intermediate bow.

The tensioning bow arrangement being formed by the main tensioning bow 58, the auxiliary tensioning bow 70 and the coupling links 68 serves for spanning a fabric covering element 78, which, in the closed position being illustrated in FIGS. 2, 5, 9, 12 and 15, spans the roof opening 14 and which, in its uncovering and open position being illustrated in FIGS. 4, 7, 11 and 14, uncovers the roof opening 14 in the region being encircled by the base frame 32. In the closed position, the main tensioning bow 58 is fixed to the front apron 16 by two closing lugs 84.

The fabric covering element 78, with its edge being arranged in the front in the longitudinal direction of the vehicle, is linked to the transverse leg 64 of the main tensioning bow 58 and is attached to the transverse leg 36 of the base frame 32 with its rear edge. As it can be taken from FIG. 17, the fabric covering element 78, in its closed position, abuts on a flange 80 of the respective longitudinal leg 34 of the base frame 32 with its edges being arranged on the side in relation to the vertical longitudinal center plane of the roof. Hereunto, at the inner side of the fabric covering element 78, a sealing layer 82 made of an elastomer material or a textile member is in each instance applied, which sealing layer abuts on the outer side of the flange 80.

List of Reference Numerals 10 vehicle structure
12 vehicle roof
14 roof opening
16 apron
18 fixed-roof portion
20 rear roof edge
22 longitudinal roof beam
24 loading space
26 rigid element
28 roof opening mechanism
30 handle screw
32 base frame
34 longitudinal leg
36 transverse leg
38 screw thread
40 transverse roof beam
42 screw thread
44 seal
46 interior paneling
48 door cut-out
50 side door
52 frame piece
54 seal
56 spacer
58 main tensioning bow
60 free leg
62 hinge point
64 transverse leg
66 hinge point
68 coupling link
69 hinge point
70 auxiliary tensioning bow
72 free leg
74 hinge point
76 transverse leg
78 fabric covering element
80 flange
82 sealing layer
84 closing lug

The invention claimed is:

1. A vehicle roof having a roof structure with a roof opening, which, by a roof opening mechanism, can be closed or at least partially uncovered as desired, said roof opening mechanism being designed as an interchangeable insert,
   wherein the interchangeable insert comprises a base frame, which follows an edge of the roof opening, wherein the roof opening mechanism further comprises a fabric covering element, which, by at least one tensioning bow fixedly pivotable with respect to the base frame, is displaceable between a closed position for covering the roof opening and an uncovering position for uncovering the roof opening,
   wherein the tensioning bow is coupled to an auxiliary tensioning bow fixedly pivotal to the base frame, and
   wherein the tensioning bow, in relation to a vertical longitudinal center plane of the roof, is on each of its two sides connected to the auxiliary tensioning bow via a coupling rod,
   the coupling rod being articulated to the auxiliary tensioning bow and to the main tensioning bow via intermediately positioned hinge points.

2. The vehicle roof according to claim 1, wherein the base frame is an open frame having the shape of an U and comprising a transversal rear leg and two longitudinal side legs.

3. The vehicle roof according to claim 1, wherein the base frame is attached to the roof structure via fixation elements being manually unlockable.

4. The vehicle roof according to claim 3, wherein the manually unlockable fixation elements are in each instance formed from a handle screw, which reaches through the roof structure from below.

5. The vehicle roof according to claim 1, wherein the tensioning bow, in the closed position, is adjacent to a front edge of the roof opening and is secured at the roof structure by a fastening mechanism.

6. A roof opening mechanism, being designed as an interchangeable insert, for unlockable fixation at a roof structure of a vehicle roof, and comprising:
- a base frame, which can be placed upon an edge region of the roof structure, said edge region for limiting a roof opening, further comprising a fabric covering element, which, by at least one tensioning bow fixedly pivotable with respect to the base frame, is displaceable between a closed position for covering the roof opening and an uncovering position for uncovering the roof opening,
- wherein the tensioning bow is coupled to an auxiliary tensioning bow fixedly pivotal to the base frame, and
- wherein the tensioning bow, in relation to a vertical longitudinal center plane of the roof, is on each of its two sides connected to the auxiliary tensioning bow via a coupling rod,
- the coupling rod being articulated to the auxiliary tensioning bow and to the main tensioning bow via intermediately positioned hinge points.

\* \* \* \* \*